United States Patent [19]

Miller

[11] 4,032,832
[45] June 28, 1977

[54] DC TO AC INVERTER WITH UNREGULATED INPUT AND REGULATED OUTPUT

[75] Inventor: Frank Donald Miller, Thousand Oaks, Calif.

[73] Assignee: Bunker Ramo Corporation, Oak Brook, Ill.

[22] Filed: July 14, 1975

[21] Appl. No.: 595,486

[52] U.S. Cl. .................................. 363/43; 363/72
[51] Int. Cl.² ..................................... H02P 13/20
[58] Field of Search ............... 321/9 R, 18, 27 MS, 321/DIG. 1

[56] References Cited

UNITED STATES PATENTS

| | | | |
|---|---|---|---|
| 3,205,424 | 9/1965 | Bates | 321/27 MS |
| 3,278,827 | 10/1966 | Corey et al. | 321/27 MS |
| 3,579,081 | 5/1971 | Bates | 321/9 R |
| 3,581,212 | 5/1971 | McMurray | 321/DIG. 1 |
| 3,657,633 | 4/1972 | Urish | 321/DIG. 1 |
| 3,750,004 | 7/1973 | Walker | 321/DIG. 1 |
| 3,775,662 | 11/1973 | Compoly et al. | 321/DIG. 1 |

FOREIGN PATENTS OR APPLICATIONS

| | | | |
|---|---|---|---|
| 31,166 | 8/1972 | Japan | 321/DIG. 1 |

OTHER PUBLICATIONS

Electronic Design News, vol. 1, No. 1, pp. 86–92, Jan. 1973.
Electronic Design 25, "Which DC/AC inverter?", Dec. 6, 1974, pp. 54–59.

Primary Examiner—William H. Beha, Jr.
Attorney, Agent, or Firm—F. M. Arbuckle; A. Freilich; A. Fernandez

[57] ABSTRACT

An inverter for producing regulated AC voltage from an unregulated DC voltage source, such as a battery, employs two stepped voltage waveform generating means independently controlled in phase to produce waveform outputs that approach sine waves which are additively combined to produce an AC output voltage whose amplitude is sensed to produce a feedback signal for comparison with a reference voltage to produce an error signal that causes one stepped waveform generating means to so shift in phase relative to the other as to reduce the error. Each stepped voltage waveform generating means is capable of producing at least half the total desired AC output voltage, so that the DC voltage source may drop by as much as 50% and the desired AC output voltage can still be maintained by shifting the relative phase between the stepped waveforms.

16 Claims, 6 Drawing Figures

DC TO AC INVERTER WITH UNREGULATED INPUT AND REGULATED OUTPUT

BACKGROUND OF THE INVENTION

This invention relates to inverters, and more particularly to a system for efficiently supplying regulated AC voltage to a load from an unregulated source of DC voltage.

In many applications it is necessary to supply AC voltage to a load from a battery source, such as in portable electronic systems and in emergency power systems for hospitals and the like. Consequently, a preferred embodiment of the invention is directed to an inverter capable of efficiently supplying regulated AC voltage from a battery to a load over an extended period during which the output voltage of the battery may decrease 50%. However, in its broadest aspects, the invention may be employed with any source of DC voltage.

SUMMARY OF THE INVENTION

In accordance with the present invention, an unregulated DC source, such as a battery, is coupled to a load by two stepped waveform generating means, each generating means being capable of delivering half the voltage to the load. The generating means produce phase displaced stepped waveforms that approximate sine waves. Means are provided for additively combining the two stepped waveforms and for phase shifting one stepped waveform relative to the other for controlling their sum applied to the load. Sensing means responsive to the amplitude of the AC output voltage applied to the load produces a feedback signal that is compared with a reference signal to produce an error signal that is applied to means for so shifting the phase of one relative to the other of the two stepped waveform generating means as to reduce the error signal.

Each stepped waveform generating means is comprised of at least two output power bridges, each bridge having an output transformer and power switches for selectively connecting the ends of a primary winding of the transformer to positive and negative terminals of the DC source. The secondary windings of the two power bridge transformers are connected in series, and a step up ratio is so preselected for each transformer that when the voltages are selectively induced and additively combined across their series-connected secondary windings, a stepped waveform approximating a sine wave is produced across the load.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
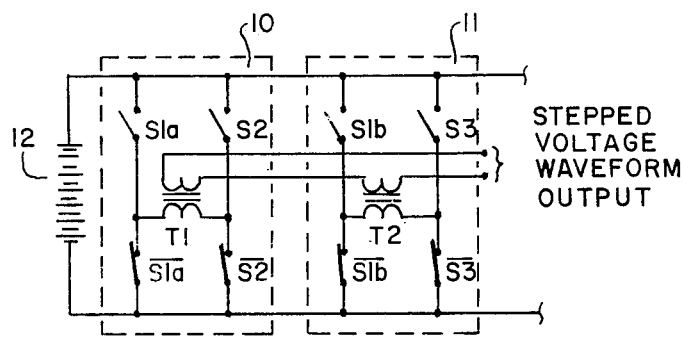
FIG. 1 illustrates two output power bridges for use in the present invention to produce a stepped voltage waveform from a DC source.

The basic concept of the present invention will first be described with reference to FIGS. 1 and 2. The circuit of FIG. 1 is a stepped waveform generator comprised of output power bridges 10 and 11 connected to a battery 12 by power switches shown schematically as single-pole switches S1a, S1b, S2 and S3 and "complementary" single-pole switches $\overline{S1a}, \overline{S1b}, \overline{S2}$ and $\overline{S3}$. The term "complementary" implies that when one switch is open, such as switch S1a, the complementary switch $\overline{S1a}$ is closed, and vice versa. The switches S1a and S1b are employed to selectively connect one end of primary windings of transformers T1 and T2 to one terminal (+) of the battery, and switches S2 and S3 are employed to selectively connect the other end of the primary windings to the same terminal (+). Complementary switches $\overline{S1a}, \overline{S1b}, \overline{S2}$ and $\overline{S3}$ are employed to selectively connect the ends of the primary windings to the terminal of the battery of opposite polarity (−).

If the switches S1a, S1b, S2 and $\overline{S3}$ are operated (closed) together, a voltage $+V_1$ is produced across the series connected secondary winding of the transformer T2. Operation of the switches S1a, S1b, $\overline{S2}$ and $\overline{S3}$ produces a voltage $+V_2$ across the transformer T1, and operation of the switches S1a, S1b, $\overline{S2}$ and S3 produces a voltage $+(V_1+V_2)$ as shown in FIG. 2. If operation of each of the switches in the three combinations is reversed, the voltages produces are $-V_1$, $-V_2$ and $-(V_1+V_2)$, and if all the possible combinations are selected in proper sequence, the result is a stepped waveform that approximates a sine wave.

Figure 2:
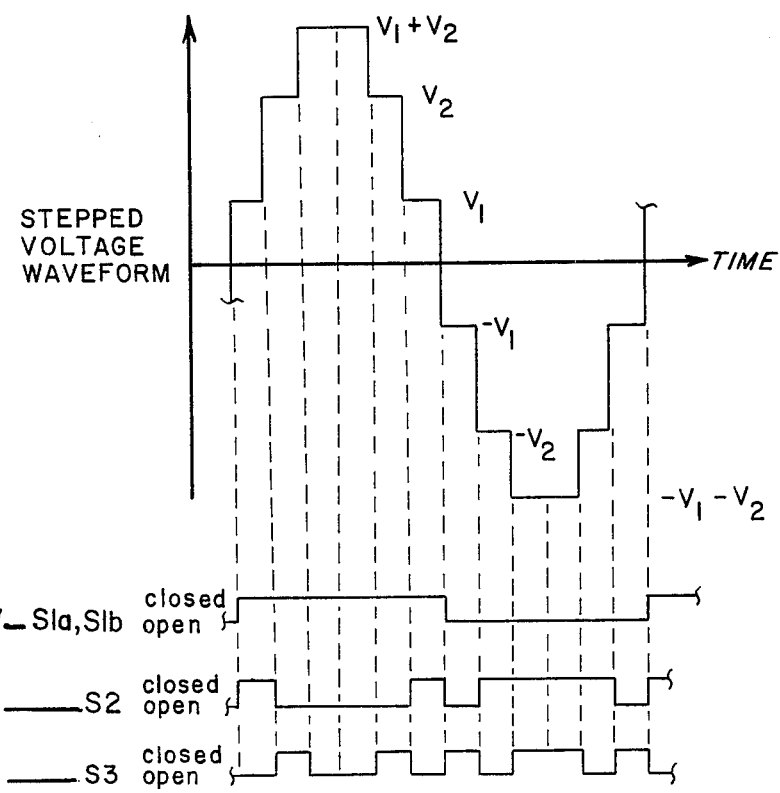
FIG. 2 illustrates a stepped voltage waveform and timing diagrams for the generation of the stepped voltage waveform by the two output power bridges of FIG. 1.

Timing waveforms W, Y and Z are shown in FIG. 2 for operation of the switches S1a, S1b, S2 and S3. The following table explicitly sets forth the requisite conditions of all the switches for the stepped waveform.

| VOLTAGE OUTPUT | CLOSED SWITCHES | | | |
|---|---|---|---|---|
| $+V_1$ | S1a | S1b | S2 | $\overline{S3}$ |
| $+V_2$ | S1a | S1b | $\overline{S2}$ | S3 |
| $+(V_1+V_2)$ | S1a | S1b | $\overline{S2}$ | $\overline{S3}$ |
| $-V_1$ | $\overline{S1a}$ | $\overline{S1b}$ | $\overline{S2}$ | S3 |
| $-V_2$ | $\overline{S1a}$ | $\overline{S1b}$ | S2 | $\overline{S3}$ |
| $-(V_1+V_2)$ | $\overline{S1a}$ | $\overline{S1b}$ | S2 | S3 |

Since switches S1a and S1b are operated together, a single control signal W operates both. When that signal is true (high) in the timing diagram of FIG. 2, both switches S1a and S1b are closed and their complementary switches $\overline{S1a}$ and $\overline{S1b}$ are open. When the control signal Y is also true, and the control signal Z is not, the transformer T1 is effectively removed from the circuit of FIG. 1, leaving only the voltage $+V_1$ induced across the secondary of the transformer T2. The turn ratios of the transformers T1 and T2 are 2.68X:1 and X:1, where X is a value selected for the particular value of voltage $V_1$ desired. When only W is true, switches S1a, S1b, $\overline{S2}$ and $\overline{S3}$ are closed to have both transformers active in the circuit. That yields the voltage $+(V_1+V_2)$. And when only W and Z are true, switches S1a, S1b and S3 are closed to effectively remove the transformer T2 from the circuit and provide a voltage output across the transformer T1 of a level $+V_2$. All switches are reversed in state for the negative voltages $-V_1, -V_2$ and $-(V_1+V_2)$, as noted hereinbefore.

It has been determined that odd harmonics up to the ninth are eliminated if the transformer turn ratios are 2.68X:1 and X:1 in producing the stepped waveform of FIG. 2. This provides highly efficient power inversion at low cost because only eight saturating switches (transistors, silicon controlled rectifiers, or the like) are required in conjunction with two transformers and a logic network for control of the power switches according to the foregoing table. The logic network may be economically manufactured as CMOS integrated circuits which require very low power.

Efficiency in power inversion arises from the elimination of the odd harmonics because harmonics must either be returned to the power supply or be wasted. In either case, the output stage of the amplifier must be overdesigned to handle both the desired fundamental and the undesired harmonics. These features are at odds with the obtainable efficiencies in classical linear amplifiers, classes A, B, etc. Thus, according to the present invention, a stepped waveform is obtained by additively combining switched voltage outputs for six discrete step levels such that only higher order (11, 13, ...) odd harmonics exist. An excellent sine wave output can be obtained by the addition of a harmonic filter to eliminate the eleventh and thirteenth harmonics.

It should be noted that although switched transformers have been illustrated in FIG. 1 as the preferred embodiment of the invention, switched output power amplifiers or other switched voltage translating means could be additively combined to produce the same stepped waveform. Consequently, the disclosure of switched transformers is by way of illustration only, and not by way of limitation.

Figure 3:
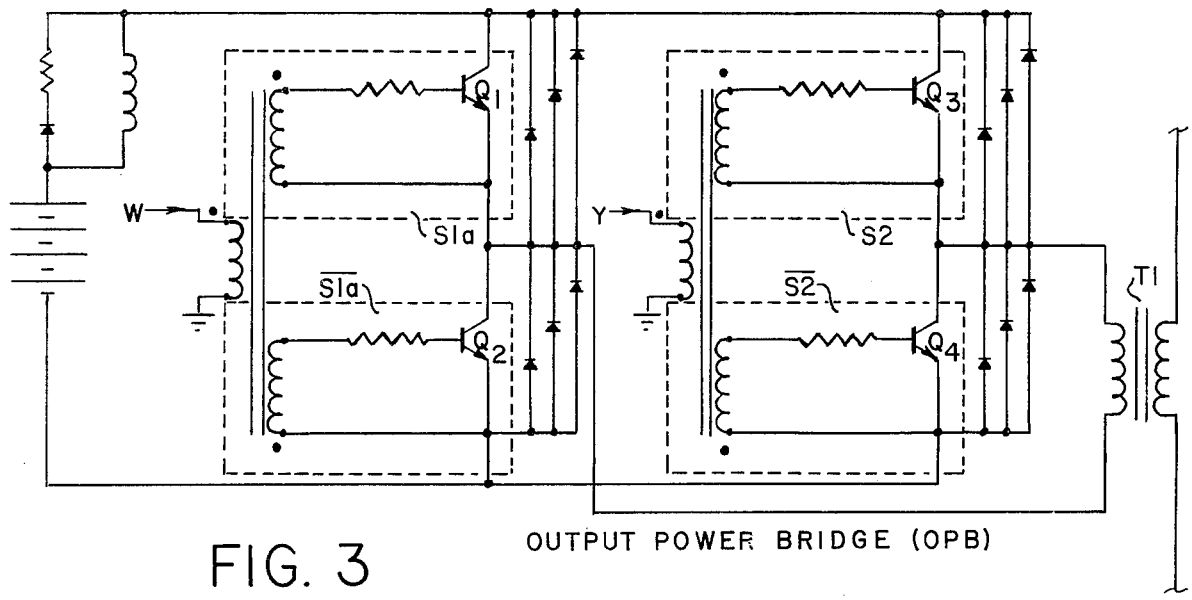
FIG. 3 is a circuit diagram of a preferred embodiment for an output power bridge.

FIG. 3 illustrates a preferred circuit for implementing an output power bridge (OPB) such as the one for the voltage $\pm V_2$ of FIG. 2, namely the transformer T1 and switches S1a, S2, $\overline{S1a}$ and $\overline{S2}$. The switches are comprised of NPN transistors $Q_1$ through $Q_4$ transformer coupled to signals W and Y. Three parallel diodes protect each transistor as shown. An OPB is provided for the voltage $\pm V_1$ of FIG. 2 identical to the OPB of FIG. 3, except for the turn ratio of its output transformer I2.

Figure 4:
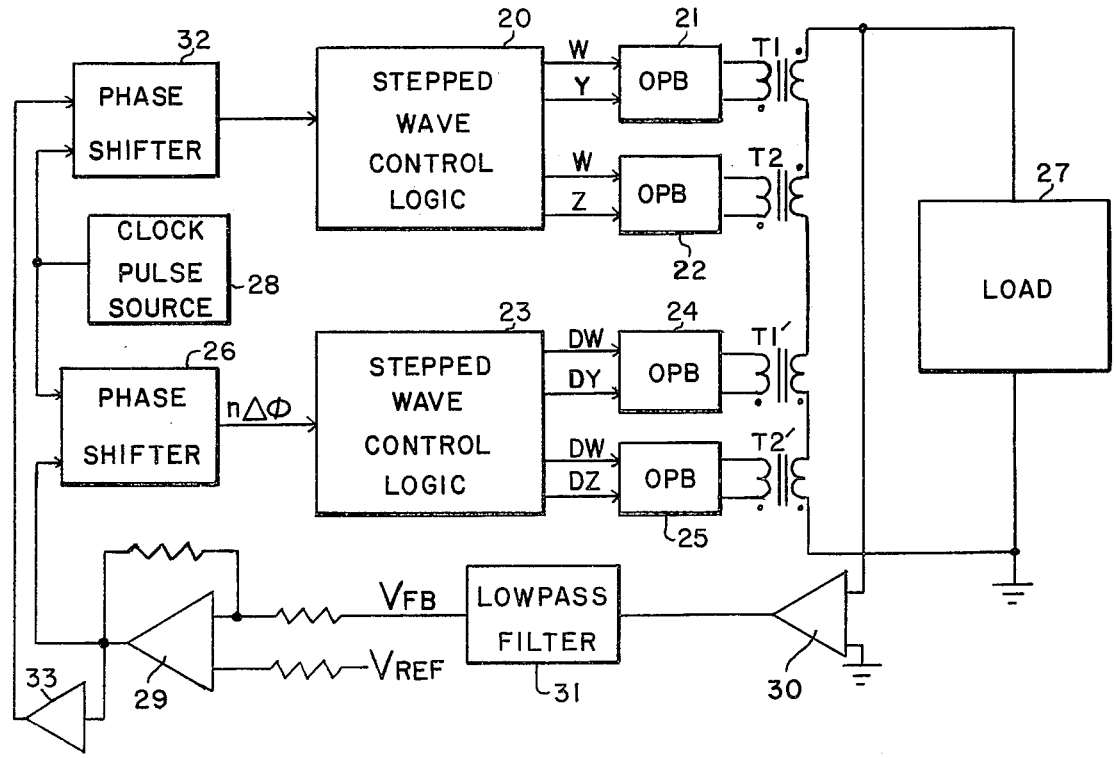
FIG. 4 illustrates the manner in which two output power bridge sections are employed to additively combine out-of-phase stepped waveforms, and to control their phase to regulate power to the load.

There are several known methods of controlling the power output of an inverter that could be employed. One is to provide complete separation of the regulation and the inverter in the form of a series regulator used to maintain a constant RMS voltage at the output of the inverter. That technique requires placing a switching transistor between the battery and a storage capacitor, and operating the switch at a rate which will maintain the storage capacitor charged to a constant level. However, this requires switching the power source. Another technique which does not require switching the power source, and which is illustrated in FIG. 4, is phase shift control of two inverters operating with their outputs additively combined.

Referring now to FIG. 45 stepped wave control unit 20 is provided to drive the switching transistors of two output power bridges 21 and 22, each power bridge being of the configuration shown in FIG. 3 with transformer turn ratios as described with respect to FIG. 1 in order to produce the respective voltages $-V_2$ and $\pm V_1$ for summing according to the timing waveforms of FIG. 2. A similar stepped wave control unit 23 drives the switching transistors of two output power bridges 24 and 25 to produce a stepped waveform 180° out of phase with that across output power bridges 21 and 22. Its phase is then controlled by a phase shifter 26 to control the output voltage as sensed across a load 27. The stepped wave control units are preferably implemented with digital counters responsive to clock pulses from a source 28. Phase shifting may then be easily carried out by inhibiting clock pulses to the unit 23 when a comparator 29 detects a difference between a feedback signal $V_{FB}$ and a reference voltage $V_{REF}$, thus shifting the phase of one stepped sinusoidal waveform relative to the other until their phase angle has been decreased from 180° to some smaller angle where the additively combined waveforms provide a voltage across the load 27 that produces a feedback signal via amplifier 30 and low pass filter 31 substantially equal to the reference.

In the case of a battery supplying the DC voltage, the regulated voltage to the load will quickly reach the desired level with a phase angle between 180° and 0° necessary for the condition of the battery. As the battery discharges, its voltage will tend to decrease, thus causing the phase angle to be further decreased toward 0°. If power to the load is turned off for some time, the battery will tend to regenerate itself. Consequently, upon turning the power back on, the voltage output to the load will be slightly higher than set by the reference voltage. To correct that, a second phase shifter 32 may be provided to inhibit clock pulses from the source 28 in response to the error voltage from the comparator 29 via an inverter 33. When the other stepped waveform is thus shifted in phase, the phase angle between the stepped waveforms will be increased to decrease the output voltage to the load. Once the error is reduced to zero, neither phase shifter will inhibit clock pulses so that the attained phase angle will be maintained until an error occurs again. To avoid overcorrecting by shifting phase too fast, each phase shifter may be implemented to inhibit only one clock pulse out of every few (for example four) cycles of the stepped waveforms while an error signal is present. In addition, a minimum error may be required before the phase shifter will begin inhibiting clock pulses by setting an inhibit control signal true only when the minimum error is present, as by a high gain saturating amplifier at the control input. This technique for correcting an error of either polarity is, of course, used with any unregulated DC voltage source for providing regulated AC voltage to a load. For the special case of a battery, however, it is possible to provide for correction of an error of only one polarity if, each time power is turned on to the load, the control units 20 and 23 are reset to a phase angle of 180°. Voltage to the load can then always be increased to the required phase angle for the condition of the battery at that time, and further increased as the battery is discharged until power to the load is turned off. That technique is employed in the exemplary embodiment of FIG. 5.

Figure 5:
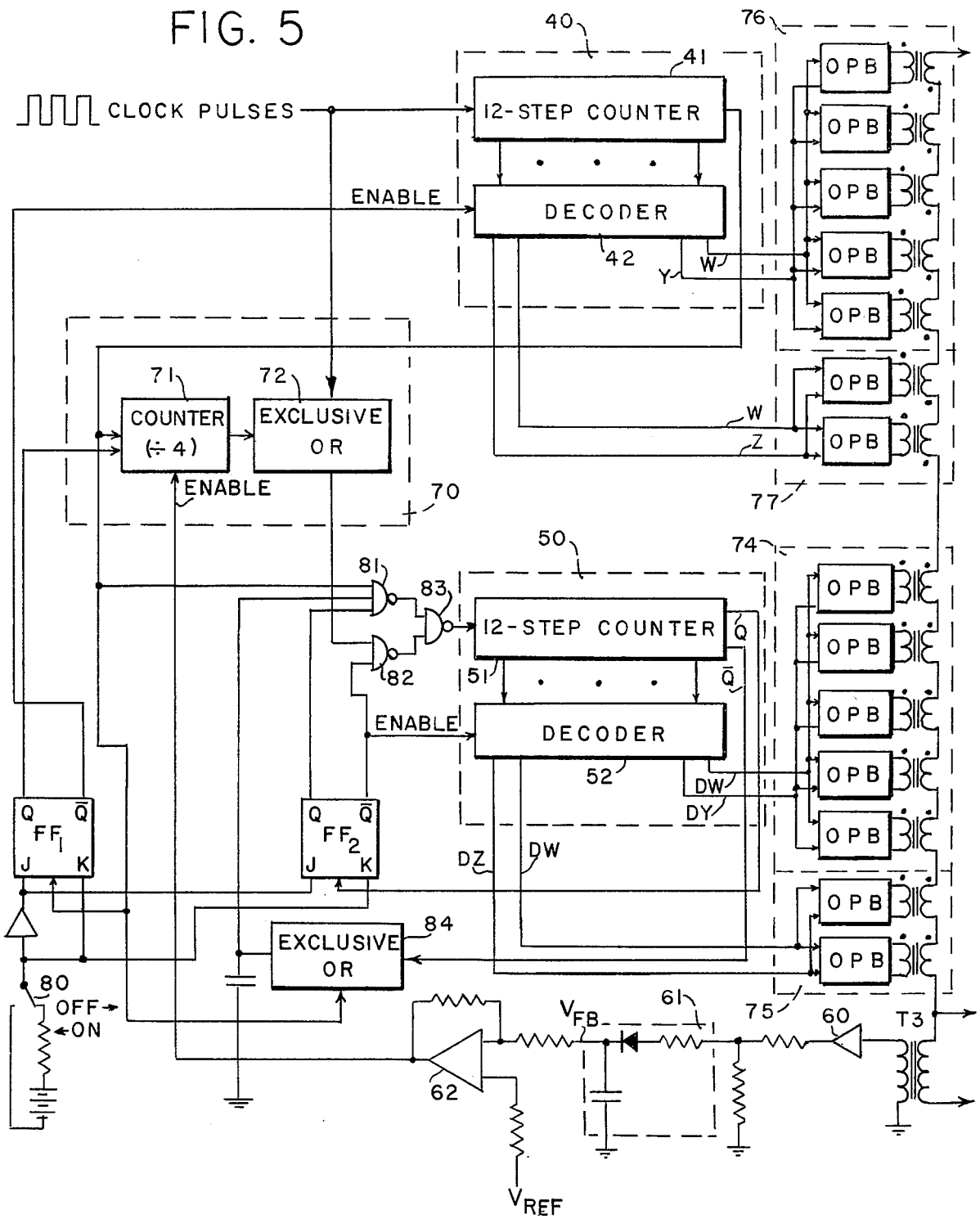
FIG. 5 illustrates a preferred embodiment of the present invention.

Referring now to FIG. 5, it is contemplated that stepped wave control logic units 40 and 50 be implemented with digital circuits comprised of CMOS counters and decoders. The counters count clock pulses from a source (not shown). Each counter counts twelve steps, six for a positive half sine wave cycle and six for a negative half sine wave cycle of the stepped output waveform, and then starts over again. A decoder responds to the counter and generates a switching pulse for each transistor as required by the timing diagram of FIG. 2. In that manner two stepped waveforms are generated each capable of delivering one half the total rated power of a load so when additively combined in the secondary windings of OPB transformers, the total rated power can be delivered to the load even through the battery source may vary over its useful life by 50%.

Initially, the two stepped waveforms generated will be 180° out of phase when the inverter is turned on by means (not shown) that initializes both counters at zero. A sense amplifier 60 drives a low pass filter 61 to produce a DC feedback signal $V_{FB}$ that is proportional to the voltage supplied to the load. That feedback signal is compared with a reference voltage $V_{REF}$ in a saturating differential amplifier 62. If the output voltage from the inverter is too low, the difference output from the amplifier 62 is positive at a predetermined logic level used in a phase shifter 70 to inhibit clock pulses, thus shifting the phase of the stepped waveform produced by a group of output power bridges 74 and 75 until the output waveform of that group of output power bridges additively combined with the output waveform of a group of output power bridges 76 and 77 reduces the error output signal from the comparator 62 to zero. Each OPB has a transformer with a turn of 0.5X:1, and the voltages $\pm V_1$ and $\pm V_2$ are generated by the respective groups of two and five OPBs operating in parallel by groups, but with the secondary windings of their transformers in series, as shown. A voltage transformer T3 has its primary winding in parallel with the load (not shown), or in series with the load when a current transformer is used.

In this exemplary embodiment, the phase shift increment $\Delta\phi$ is 7.5°, and the total phase shift $n\Delta\phi$ is equal to the number n of clock pulses inhibited. However, the increment may be selected to be any greater angle such as 15°, or some smaller angle such as 1° for finer control of the power output. Such finer control could be accomplished by using a higher frequency clock, inserting a frequency divider at the input of each stepped waveform control unit, and inhibiting clocks to the frequency divider at the input of the inverter to be phase controlled.

The phase shift rate of control selected for this exemplary embodiment is one half a clock period (7.5°) of clock pulses applied to a 12-step counter 41 for every four cycles of the stepped output waveform, as determined by a counter 71 which divides the output of the counter 41 by four. The output of the counter 71 is combined in an exclusive-OR circuit 72 with the clock pulses to drive a 12-step counter 51 of the stepped wave control unit 50. A decoder 52 decodes the 12 steps and operates the OPB groups 74 and 75 to generate a stepped waveform additively combined with the stepped waveform generated by the operation of the 12-step counter 41 and decoder 42 in direct response to clock pulses.

When power is first turned on, all counters are initially set to zero (by means not shown) while the counter 71 is set to binary 11 to produce a positive output. Consequently, the counters 41 and 51 will initially operate synchronously, thus producing stepped waveforms 180° out of phase owing to the polarity of the secondary windings of the OPB groups 74 and 75 vis-a-vis the polarity of the secondary windings in the OPB groups 76 and 77. The groups operating as two stepped waveform generators thus produce zero output when power is first turned on. An error signal from the comparator amplifier 62 enables the counter 71 to start counting cycles of the counter 41. Its output then goes to a low level.

Figure 6:
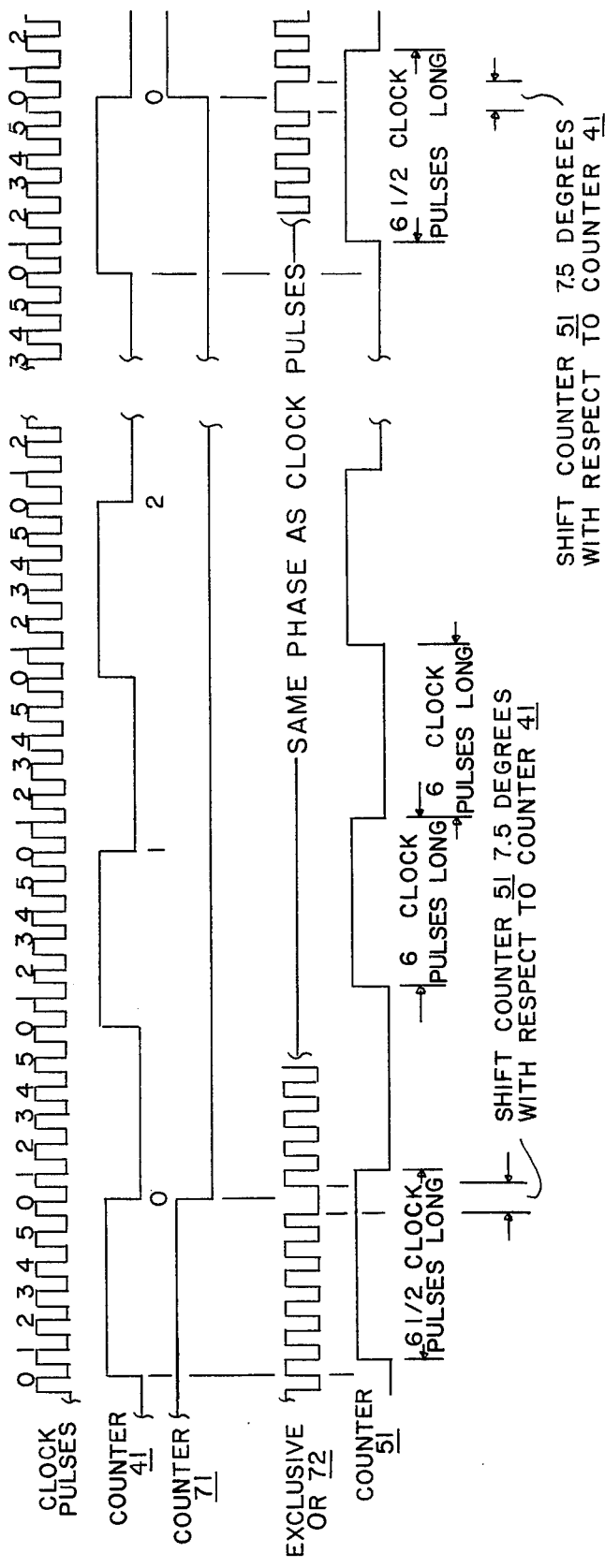
FIG. 6 is a timing diagram useful in understanding the phase shift control implemented in the preferred embodiment of FIG. 5.

When the output of the counter 41 goes low, as shown in FIG. 6, it will cause the exclusive-OR circuit 72 to inhibit one clock pulse otherwise applied to the counter 51 due to the inherent function of an "exclusive-OR" network, which is to transmit a high level signal from the clock source or the counter 71, but not both, as shown in FIG. 6. If a phase shift of 7.5° of the counter 51 is sufficient to correct the error, the counter 71 will be disabled before it counts four cycles of the counter 41. Its output will then remain low to prevent any further phase shift until another error signal occurs to enable it. It will then count through, and when its output goes high again (after counting four cycles of the counter 41 has been completed) the phase of the counter 51 is again shifted 7.5° by inhibiting another clock pulse transmitted by the exclusive-OR circuit.

It should be noted that in the one case (output of counter 71 high), pulses transmitted by the exclusive-OR circuit 72 are the negative going half cycles of the clock pulse waveform, and vice-versa. Consequently, with each transition of the output of the counter 71, there is a 7.5° shift in the phase of the counter 51. Therefore, if the error persists (as it will initially upon turning power on to the load) the counter 51 will be shifted 7.5° in phase relative to the counter 41 every four cycles of the counter 41 until the phase of the counter 51 has been shifted (delayed) enough to remove the error.

If the voltage applied to the groups of output power bridges is from a battery, the output voltage reached will tend to slowly degrade but will otherwise be quite stable and will not at any time significantly exceed the reference so that it never becomes necessary to shift the relative phase of the two counters 41 and 51 in the opposite direction. In other applications where the DC voltage source is subject to surges rather than a steady decline, a separate reference comparator and phase shifter may be provided to phase shift the counter 41 by inhibiting clock pulses in the same way to bring the output voltage back down to the reference, as described with reference to FIG. 4.

Assuming a battery for the source, as the DC voltage decreases, the error signal will come on again from time to time, causing the counter 71 to resume counting cycles of the counter 41, and in so doing resume inhibiting clock pulses transmitted by the "exclusive-OR" network 71, until a total phase shift of 180° has been introduced in the counter 51, putting the stepped waveforms generated by the two counters 41 and 51 (via decoders 42 and 52) in phase. That is the limit of control.

In some applications the power will be turned on and off. Each time the power is turned on, the counters 41 and 51 should be reset to zero. That is because most batteries have a tendency to regenerate themselves slightly when not in use, and the control system of this exemplary embodiment can approach the reference from only one side. But that is a purely arbitrary choice. The present invention is not limited to use with a battery or, as just noted, to approaching the reference from one direction. However, regardless of the nature of the DC voltage source, it is desirable to stop the counters 41 and 51 when their decoded outputs produce a zero voltage at the end of a positive half cycle so that the remnant flux in the cores of the OPB transformers is a minimum and of the opposite polarity for the next step to be generated. That is accomplished in the following manner.

Two JK flip-flops $FF_1$ and $FF_2$ are controlled by an ON-OFF switch 80. When the switch is set to the ON position, the flip-flop $FF_1$ is set with the next positive output from the counter 41 (i.e., at the beginning of a negative half cycle of the output of the counter 41 when the stepped waveform it controls first goes negative). That enables the decoder 42 to respond to the counter 41 which is running even while the switch 80 is in the OFF position shown. Setting the flip-flop $FF_1$ resets the counter 71. The flip-flop $FF_2$, also controlled by the ON-OFF switch, is not set until the counter 51 completes a cycle. Counters 41 and 42 are synchronized when the switch 80 is turned to the ON position. Consequently, the flip-flop $FF_2$ controls a NAND gate 81 to transmit pulses from the clock source until it is set at the end of a cycle of the counter 51. At that time a NAND gate 82 is enabled to allow clock pulses to be applied to the counter 51 from the phase shifter 70. NAND gate 83 transmits pulses from either NAND gate 81 or 82. Regulation then proceeds as described hereinbefore.

When the ON-OFF switch 80 is returned to the OFF position, the flip-flop $FF_1$ is reset at the end of a positive half cycle of the counter 41. The flip-flop $FF_2$ is not reset until the counter 51 also completes a positive half cycle. The NAND gate 81 is then enabled to transmit clock pulses, while the decoder 52 is disabled. An "exclusive-OR" circuit 84 will, however, inhibit clock pulses at the NAND gate 81 until the counter 41 is phase shifted one half cycle, thus restoring the phase difference between the counters 41 and 51 to 180°. Once the phase difference of 180° is restored, the gate 81 transmits clock pulses to operate the counter 41 in synchronism (but 180° out of phase) with the counter 51.

Although particular embodiments of the invention have been described and illustrated herein, it is recognized that modifications and variations may readily occur to those skilled in the art. It is therefore intended that the claims be interpreted to cover such modifications and variations.

The embodiments of the invention in which an exclusive property or privilege is claimed are defined as follows:

1. A DC to AC inverter for an unregulated DC voltage source comprising
   two stepped waveform generating means connected to said source, each stepped waveform generating means being capable of delivering from said source one half the total desired voltage amplitude in the form of phase displaced, digitally controlled, stepped waveforms that approach a sine wave, each of said waveform generating means comprising a source of clock pulses at a substantially constant frequency and a step counter responsive to said clock pulses for timing said steps;
   means for additively combining said stepped waveforms to produce an output voltage,
   means for sensing said output voltage and producing a feedback signal proportional to its amplitude,
   means for comparing said feedback signal with a reference signal to produce an error signal proportional to the difference therebetween, and
   means responsive to said error signal for inhibiting said clock pulses from reaching the step counter of one of said two-stepped waveform generating means, thereby phase shifting the stepped waveform of one stepped waveform generating means relative to the other to reduce said error signal.

2. The combination of claim 1 wherein each stepped waveform generating means is further comprised of at least two power bridges, each having an output transformer for selectively delivering a voltage of either polarity across a secondary winding and means for selectively connecting the ends of primary windings of said transformers to positive and negative terminals of said DC voltage source in response to states of said step counters, and wherein said secondary windings of said transformers are connected in series.

3. The combination of claim 2 wherein a step up ratio is preselected for each transformer such that, when voltages are selectively induced and additively combined across said series connected secondary windings, said stepped waveform approaches a sine wave.

4. The combination of claim 2 wherein said stepped waveform generating means generates said stepped waveforms in six steps with voltage levels of $\pm V_1$, $\pm V_2$ and $\pm(V_1+V_2)$, and is comprised of two power bridges, each having an output transformer for selectively delivering a voltage of either polarity across a secondary winding, and means for selectively connecting the ends of primary windings of said transformers to positive and negative terminals of said voltage source, one transformer having a step up turn ratio of about 2.68X:1 for the voltage $\pm V_2$ and the other having a step up turn ratio of X:1 for the voltage $\pm V_1$, where X is a selected value.

5. The combination of claim 2 wherein said stepped waveform generating means generates said stepped waveforms in six steps with voltage levels of $\pm V_1$, $\pm V_2$ and $\pm(V_1+V_2)$, and is comprised of two groups of similar power bridges, one group of five having a transformer in each, and one group of two having a transformer in each, each transformer having the same voltage step up turn ratio and its secondary winding connected in series with the secondary windings of all other transformers.

6. An inverter for producing regulated AC voltage at a desired amplitude level from an unregulated DC voltage source comprising
   two stepped waveform generating means for producing from said DC voltage separate stepped waveforms approaching a sine wave at the same frequency, each step being equal to said DC voltage multiplied by some predetermined constant, each of said waveform generating means comprising a source of clock pulses at a substantially constant frequency and a step counter responsive to said clock pulses for timing said steps;
   means for additively combining said separate stepped waveforms to produce an AC output voltage,
   means for sensing and filtering said output voltage to produce a DC feedback signal proportional to the amplitude of said AC output voltage,
   means for comparing said feedback signal with a reference signal to produce an error signal when the amplitude of said output voltage is below said desired level, and means responsive to said error signal for inhibiting said clock pulses from reaching the step counter of one of said two-stepped waveform generating means, thereby shifting the phase of one of said stepped waveform generating means relative to the other to reduce said error signal.

7. Apparatus as defined in claim 6 wherein each stepped waveform generating means is capable of producing at least half the total desired AC voltage amplitude whereby said DC voltage source may drop by as much as fifty percent and the desired output voltage amplitude can still be maintained by shifting the phase of one stepped waveform generating means relative to the other.

8. Apparatus as defined in claim 7 wherein each stepped waveform generating means is comprised of at least two power bridges, each having an output transformer for selectively delivering a voltage of either polarity across a secondary winding and means for selectively connecting the ends of primary windings of said transformers to positive and negative terminals of said DC voltage source, and wherein said secondary windings of said transformers are connected in series.

9. Apparatus as defined in claim 8 wherein a step up ratio is preselected for each transformer such that, when voltages are selectively induced and additively combined across said series connected secondary windings, said stepped waveform approaches a sine wave.

10. Apparatus as defined in claim 9 wherein said DC voltage source is a battery source and including means for initiating operation of said two stepped waveform generators 180° out of phase whenever power from said inverter is turned on to be applied to a load, whereby said desired output voltage level is always approached from below, and is always maintained at said desired level as said battery discharges and its DC output voltage drops.

11. In combination,
an unregulated DC voltage source coupled to a load by a pair of means for generating stepped waveforms at the same frequency, each generating means comprising a source of clock pulses at a substantially constant frequency, a step counter responsive to said clock pulses, and a count decoding means connected to said step counter for timing and controlling the amplitude of said steps of each stepped waveform generating means, each stepped waveform generating means being comprised of two transformers having turn ratios of X:1 and about 2.68X:1 and being capable of delivering six-step waveforms of half the desired AC voltage to said load, and said pair of stepped waveform generating means producing two phase displaced stepped waveforms, each stepped waveform approximating a sine wave, means for additively combining said two stepped waveforms, means for sensing the amplitude of the AC voltage applied to said load, means responsive to said sensing means for generating an error signal proportional to the amplitude difference between the AC voltage applied to said load and said desired AC voltage, and means responsive to said error signal for adjusting the relative phase shift between said two stepped waveforms, to reduce said error signal toward zero.

12. The combination of claim 11 wherein said phase adjusting means includes a first circuit for adjusting the phase of one stepped waveforms relative to the other when said reference signal exceeds said feedback signal, and for adjusting the phase of the other stepped waveform relative to said one stepped waveform when said feedback signal exceeds said reference signal.

13. In combination,
an unregulated DC voltage source coupled to a load by a pair of means for generating stepped waveforms at the same frequency, each generating means comprising a source of clock pulses at a substantially constant frequency and a step counter responsive to said clock pulses for timing said steps of each stepped waveform generating means, and each generating means being capable of delivering half the desired AC voltage to said load, said pair of stepped waveform generating means producing two phase displaced stepped waveforms, each stepped waveform approximating a sine wave, means for additively combining said two stepped waveforms, means for sensing the amplitude of the AC voltage applied to said load, means responsive to said sensing means for generating an error signal proportional to the amplitude difference between the AC voltage applied to said load and said desired AC voltage, and means responsive to said error signal for adjusting the relative phase shift between said two stepped waveforms, to reduce said error signal toward zero, wherein said adjusting means is comprised of means responsive to said error signal for inhibiting said clock pulses from reaching the step counter of one of said two stepped waveform generating means.

14. The combination of claim 13 wherein said inhibiting means operates to inhibit only one clock pulse every predetermined number of cycles of one of said step counters.

15. The combination of claim 13 wherein said inhibiting means is comprised of a cycle counter for counting said predetermined number of cycles, an exclusive-OR circuit having one input terminal connected to said source of clock pulses and another input terminal connected to the output of said cycle counter, and means for coupling the output of said exclusive-OR circuit to the step counter of one of said stepped waveform generating means, 16. The combination of claim 15 wherein said DC voltage source is a battery source and including means for initiating operating of said stepped waveform generators 180° out of phase whenever power from said battery source is turned on to be applied to said load, whereby said desired AC voltage to said load is always approached from below, and is maintained as said battery source discharges and its DC voltage drops.

* * * * *